Dec. 25, 1945. C. J. SCRANTON 2,391,846
CORN HARVESTER HUSKING ROLL
Filed Nov. 6, 1943
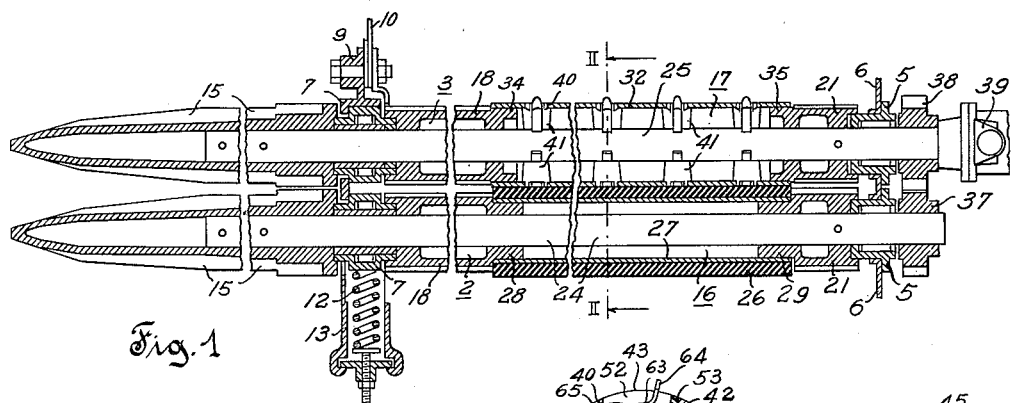
Fig. 1
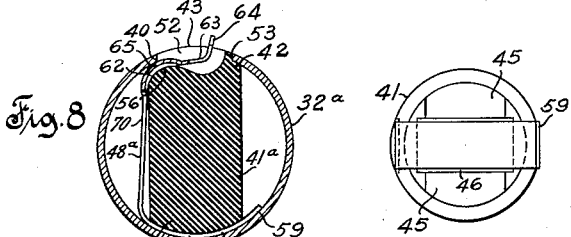
Fig. 8  Fig. 7
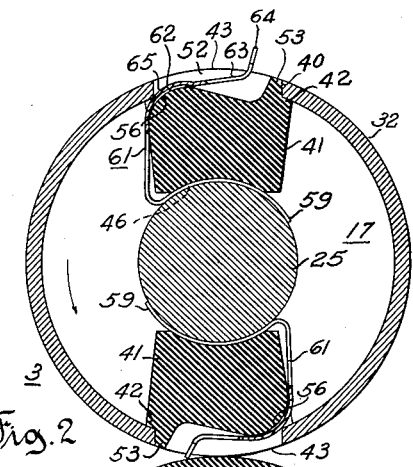
Fig. 2
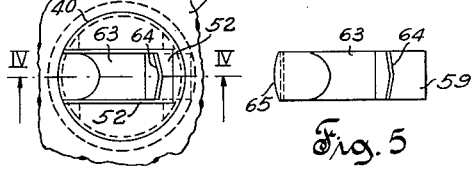
Fig. 3  Fig. 5
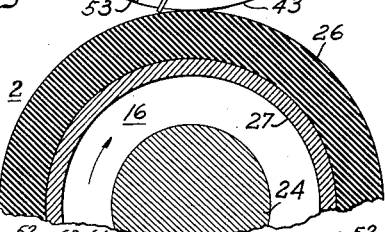
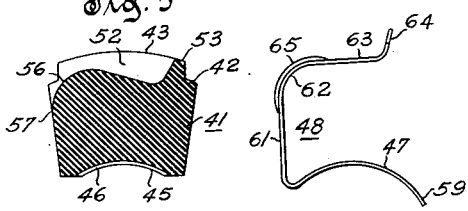
Fig. 4  Fig. 6
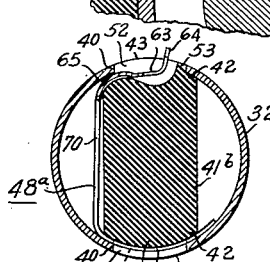
Fig. 9
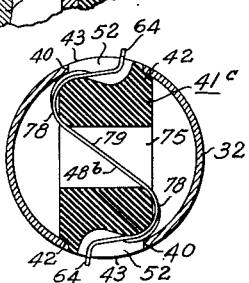
Fig. 10
Inventor
C. J. Scranton
by J. J. Kane
Attorney Patented Dec. 25, 1945

2,391,846

UNITED STATES PATENT OFFICE 2,391,846

CORN HARVESTER HUSKING ROLL

Charles J. Scranton, La Porte, Ind., assignor to Allis-Chalmers Manufacturing Company, Milwaukee, Wis., a corporation of Delaware Application November 6, 1943, Serial No. 509,217

19 Claims. (Cl. 130—5)

This invention relates in general to apparatus for harvesting corn, and it has more particular relation to improvements in the design and construction of harvesting rolls for removing husks from picked ears of corn.

Certain commercial forms of husking rolls or roll sections of corn harvesting rolls, whose function is to remove the husks from picked ears of corn through the action of the oppositely rotating rolls, include as a feature of one or both of the cooperative rolls a plurality of husking points or pegs mounted on the roll and projecting beyond the periphery thereof and operative to scratch or bite into the husks of the picked ears and pull out or loosen portions of the husks to a sufficient extent to facilitate the action of the rolls in seizing the husk and drawing the same downwardly through the rolls, while permitting the ear, with the husk removed therefrom, to pass over the rolls to a suitable point of discharge. Husking rolls of the prior art have been provided with various forms of fixed or unyielding husking pegs or points, and in some cases with one or another form of yielding husking pegs mounted in apertures in the husking rolls and retractible to a greater or less extent within apertures in the surface portion of the roll, as the outer end of the husking peg contacts the surface of the cooperative rotating roll and the latter exerts increasing pressure on the husking peg.

Where the husking pins or pegs are of the yieldable type and retractible into recesses in the rolls during normal operation, such an arrangement possesses the advantage of permitting the rolls to be set close together, so that the surface portions of one roll pass in contact or very close proximity to the working surface of the cooperative roll, thus insuring a firm grip by the rolls on the husks, thus enabling them to more effectively draw the husks through the rolls and remove them from the ear which remains at the upper side of the rolls. However, husking rolls provided with prior art types of yieldable or retractible husking pins or pegs possess certain disadvantages among which are relatively great complexity and cost and difficulty in assembling and maintaining the husking pegs or points and the surfaces of the cooperative rolls in efficient operative condition, and more particularly since sap from green stalks or leaves collects on the rolls at the husking pegs, and dirt or mud may collect and freeze at the openings in which the pegs are mounted, interfering with the effective and efficient action of the yieldable husking pegs and the husking roll surfaces during operation.

The present invention contemplates the provision of an improved design of husking roll of the type utilizing yieldable or retractible husking pegs or points, wherein the husking pegs and their mounting on the roll are such as affords a relatively simple and inexpensive husking peg and mounting arrangement such as may be readily and quickly assembled in operative position on the roll, and avoids disadvantages of prior art husking peg arrangements, while at the same time permitting the adjacent surfaces of the cooperative husking rolls to be in close proximity to each other during operation.

While advantages of the present invention may be attained in a variety of forms, particularly advantageous results are attained in accordance with the present invention where the husking peg is formed as a yieldable projection on a spring element formed to normally seat and retain itself in operative position on a plug-like support which is yieldable to the extent of permitting a shoulder portion on the plug to be inserted into position within an opening in the roll and to retain itself in position on the roll through the cooperative action of such yieldable shoulder portion and a portion of the roll, and wherein the mounting plug closes the opening in the roll.

It is an object of the present invention to provide an improved and simple design and construction of husking roll embodying husking points or pegs yieldably mounted on the roll for facilitating the removal of the husks from picked ears of corn or the like during the operation of the rolls.

It is a further object of the present invention to provide an improved and simple design and construction of husking roll embodying a yieldable husking point or peg carried by a support having a shoulder portion readily insertible to operative position in the roll and held against accidental removal therefrom through the effect of such shoulder portion.

It is a further object of this invention to provide an improved design and construction of husking roll embodying a yieldable husking point or peg carried by a spring element mounted on a support insertible in an aperture in the roll and retained therein through coaction of a shoulder portion of the support with a portion of said roll.

It is a further object of the present invention to provide an improved husking peg and mounting therefor for attachment in a recess of a husking roll, wherein the husking peg is in the form of a terminal portion of a resilient member yieldingly maintained in position on a support insertible into operative position in the recess in the roll and retainable therein through coaction of a shoulder on the support with an internal shoulder on the roll.

These and other objects and advantages are attained by the present invention, novel features of which will be apparent from the description herein and the accompanying drawing, disclosing embodiments of the invention, and will be more particularly pointed out in the annexed claims.

In the accompanying drawing:

Fig. 1 is a cross-sectional view in a transverse plane extending through the axes of a pair of cooperative harvesting rolls embodying features of the present invention.

Fig. 2 is an enlarged cross-sectional view in the plane of the line II—II of Fig. 1.

Fig. 3 is a fragmental plan view of one of the husking rolls with a husking element in position therein.

Fig. 4 is a cross-sectional view, in the plane of the line IV—IV of Fig. 3, of a detail of the support for the husking element.

Figs. 5 and 6 are a plan view and a side view, respectively, of the resilient metal husking peg shown in Figs. 2 and 3.

Fig. 7 is a plan or face view of the inner end of the husking element, shown in Figs. 2, 3 and 4.

Figs. 8, 9 and 10 are radial sectional views through a husking roll provided with husking elements of modified form.

In the embodiment of the invention illustrated in Figs. 1 to 7 of the drawing, 2 and 3 represent outer and inner, respectively, rolls of a pair of oppositely rotatable, cooperative harvesting rolls of a corn harvester, the rolls being disposed in generally side by side relation, but preferably with the outer roll 2 set slightly higher than the inner roll 3. The rolls are disposed in operative position for rotation along their longitudinal axes, with journal portions of the rolls rotatably mounted and secured against longitudinal movement in bearings carried by rear bearing housings 5 mounted on a supporting bracket 6 carried by the frame of the corn harvester, and in bearings carried by bearing housings 7 at forward portions of the rolls 2 and 3. The bearing housings 7 are carried in guided relation on a supporting bracket 9 mounted on the harvester frame, the bearing housing 7 on the outer roll 2 being yieldably biased, to maintain the roll 2 in desired normal position with respect to the roll 3, by means of an adjustable biasing spring 12 mounted within a tubular extension 13 of the bearing bracket 9.

The harvester rolls are shown as being of the type including a forward picking or snapping roll or roll section 15 tapered and spirally fluted at its forward end and having its rear portion of generally cylindrical form with parallel flutes serving to snap the ears of corn from the stalks, and a rearwardly disposed husking roll or roll section 16, on roll 2, and 17, on roll 3.

The picking or snapping roll sections 15 of the rolls are disposed forwardly of the journal portions thereof mounted in the bearing housings 7, and each assembled roll preferably includes a trash-removing roll section 18 between the husking roll section 16 or 17 and the bearing housing 7. And cooperative trash-removing roll sections 21 are preferably provided rearwardly of the husking roll sections 16, 17, between the latter and the rear bearing housings 5.

The harvesting rolls 2 and 3 are preferably of a built-up type wherein the several roll portions or sections of each roll are securely mounted, preferably in a removable manner, on a shaft 24 for the roll 2 and 25 for the roll 3, these shafts serving as the journal portions of the rolls. As indicated, the harvesting roll 2 includes the shaft 24 rotatably mounted in bearings in the bearing housings 5 and 7, and with the picking or snapping roll or roll section 15 secured, by a suitable pin connection, to the shaft 24, and a roll portion, made up of the trash-removing section 18, the husking roll section 16 and the trash-removing section 21, secured to the shaft 24 by a suitable pin connection at least between the trash-removing section 21 and the shaft. The husking roll or roll section 16 is in the form of a tubular element having a relatively smooth husking surface portion of resilient material, such as rubber, indicated at 26, secured upon a metal supporting tube 27, this built-up husking roll section being secured in position with respect to the trash-removing sections 18 and 21 through reduced extensions 28 and 29 at the rear end of the trash-removing section 18 and the forward end of the trash-removing section 21, respectively, end portions of the husking roll section being suitably pinned to these reduced end extensions 28 and 29.

The harvesting roll 3 includes the shaft 25 rotatably mounted in bearings in the bearing housings 5 and 7, with the picking or snapping roll section 15 suitably secured to the shaft forwardly of the journal portion thereof, and a roll portion made up of the trash-removing section 18, the husking roll section 17 and the trash-removing section 21, the latter being suitably secured to the shaft. The husking roll section 17 is in the form of a metal tube 32 having a relatively smooth active husking surface, welded or otherwise suitably secured at the end portions thereof upon an annular rear extension 34 of the trash-removing section 18 and an annular forward extension 35 on the trash-removing section 21.

The rear ends of the roll shafts 24, 25 extend rearwardly beyond the bearing housings 5 and are provided with meshing gears 37, 38, respectively, and the adjacent end of one of these shafts, such as the shaft 25, is provided with a driving connection, such as a flexible coupling 39, to a suitable source of power. It will be apparent that when the roll 3 is driven, the cooperative roll 2 is driven in an opposite direction of rotation, through the meshing gears 37, 38 on the shafts of the rolls.

The apertured metal tube 32 of the husking roll or roll section 17 is provided with a suitable number and arrangement of through apertures 40, here shown as arranged in two diametrically opposite longitudinal series. Within each of the apertures 40 is disposed a supporting plug 41 having an outwardly facing peripheral abutment shoulder 42 which engages the inner surface of the tube or roll about the aperture therein to prevent outward displacement of the plug under ordinary conditions, the outer face of the abutment 42 being of suitable curvature to seat along the full circumference of the opening, against the inner surface of the roll; and the outer reduced end portion 43 occupies the aperture 40, having a relatively close fit with the wall of the aperture. The outer end surface of the supporting plug 41 is preferably of the same cylindrical curvature as the roll or tube 32, so that when the plug is in normal position in the opening, the outer surface of the portion 41 of the plug forms a portion of the cylindrical surface of the roll. The inner end of the supporting plug 41 is suitably formed to be positioned or seated against an interior portion of the roll, being here shown as seated against the adjacent portion of the shaft 25, the inner face of the plug, over a considerable area thereof, being formed or recessed along a cylindrical surface concentric with the shaft, as indicated at 45, so as to substantially seat against the surface of the shaft over an extended area. The inner face of the plug is provided with a shallow recess extending transversely of the shaft receiving recess, as indicated at 46, the inner face of the latter recess being concentric with the inner face of the recess 45 and the surface of the shaft 25.

As indicated in Figs. 2 and 4, the plug 41 is slightly tapered toward its inner end, the cross-section at the inner end being approximately that of, or slightly smaller than, the cross-section of the aperture 40 in the roll, so that the inner end of the plug may be readily inserted within the aperture. As force is applied to press the plug into normal operative position within the aperture 40, the resilient material of the plug is compressed sufficiently to permit the body of the plug, including the shouldered portion 42, to be forced through the aperture to the inner side of the roll to a position wherein the inner face of the plug seats, along the face of the recess 45, on the shaft 25, and the body of the plug, with the shouldered portion 42, then immediately resumes normal shape, with the shoulder 42 inside the wall of the tubular roll, and the plug being held against outward displacement from the aperture by the shoulder 42 bearing against the inner surface of the roll. The length of the plug 41, i. e., radially of the roll, is preferably such that, with the plug in normal position, wherein the shouldered portion 42 bears against the inner surface of the roll, the plug is under an appreciable degree of compression radially of the roll so that the shoulder 42 bears forcibly against the inner surface of the roll, and the inner face of the plug bears forcibly against the surface of the shaft 25, with the result that the plug is more effectively held in desired operative position.

The transverse recess 46 at the inner face of the plug 41 is of a depth approximately the same as the thickness of an inner seating portion 47 of a resilient spring 48 formed from flat stock and whose outer end is formed and positioned to function as a husking point or peg. This recess 46 is of such width as to receive, with a comfortably close guiding fit, and definitely position against lateral movement, the inner bowed portion 47 of the spring, the normal curvature of this seating portion 47 corresponding closely with that of the face of the recess 46 and the shaft 25.

The outer reduced portion 43 of the plug 41, which extends through the aperture 40 in the roll, is provided with a recess 52 extending in the same direction as the recess 45 at the inner face of the plug, this recess 52 extending at one end almost to and terminating short of the periphery of the portion 43 of the plug, to form an end wall or abutment 53 of increasing width toward its base or inner end. This recess 52 is of maximum depth adjacent its end wall 53 and of gradually reducing width toward the opposite end, the recess at this latter end being continued for a short distance over the adjacent side wall of the plug, and the bottom of the recess forming a curved or rounded corner at this point, as indicated at 56, which gradually merges, as indicated at 57, into the side wall of the plug.

The free end of the inner bowed portion 47 of the spring preferably extends appreciably beyond the end of the spring-occupying recess 45 and also the adjacent side surface of the plug, as indicated at 59; and at the opposite end of the bowed portion 47, the spring is bent along a relatively sharp curve to form a side portion 61 extending along the side of the plug 41. At the upper end of the side portion 61, the spring is bent along a gradual curve, corresponding approximately to the curvature of the corner portion 56 of the bottom of the recess 52 at the outer face of the plug, as indicated at 62; and when the spring is in place on the plug, this curved or corner portion of the spring seats on or against the rounded corner portion 56 of the recess. The outer portion 63 of the spring extends at substantially right angles to the side portion 61 and in the same general direction as the lower bowed portion 47. And the end of the upper portion 63 is turned outwardly at an angle of approximately 45 to 60 degrees, as indicated at 64, the extreme end being formed or ground to provide a rounded point to act as the contact end of a husking point or pin. The outer portion of the spring is of width to fit quite closely in the recess 52 of the plug, the side walls of the recess guiding this portion of the spring during its flexure.

The material of the spring 48, at the rounded corner 62 where there is repeated flexure of the spring during normal operation of the husking element, is ribbed or arched transversely, as indicated at 65, for the purpose of strengthening this portion of the spring.

The spring 48 may be assembled in position on the plug 41 by forcing the body of the spring over the plug, or the plug may be forced into the opening between the inner and outer portions 47 and 63, respectively, of the spring, to cause the inner portion 47 of the spring to be forced into and seated in the recess 46 at the inner face of the plug, and the outer portion 63 of the spring, and particularly the rounded corner portion 62 thereof, into the recess 52 of the plug. Due to the fact that the normal distance between the inner and outer portions 47 and 63, respectively, of the spring is less than the length of the plug, the resilience of the spring holds it in definitely fixed position on the plug, this normal fixed position being generally that indicated with respect to the spring and plug assembly as shown in Fig. 2.

With the spring assembled on the plug in the manner hereinabove indicated, the spring and plug assembly may be readily inserted into operative position on the roll 32, by first passing the lower side portion of the plug, with the projecting end extension 59 of the inner portion 47 of the spring, through the aperture 40 and then with the required motion, forcing the remainder of the plug and the side portion 61 of the spring thereon inwardly through the aperture 40 until the inner face of the plug and the portion 46 of the spring are in desired operative surface engagement with the shaft, and the outer shouldered portion 42 of the plug, and the adjacent portion of the round corner 62 of the spring have passed through the opening 40, after which the resilience of the plug permits the shouldered portion 42 to expand outwardly and, with the adjacent portion of the rounded corner 62 of the spring, forcibly seat against the inner surface of the roll about the aperture 40 therein.

The plug and husking spring assembly is thus secured in operative position on the roll.

With the resilient husking pins and supporting plugs therefor mounted as hereinabove described, in the several apertures 40 of the metal tube 32 of the husking roll section 17, and the latter mounted in normal cooperative relation with the oppositely rotating rubber-surfaced husking roll section 16, the action of the husking points or pegs 64 of the springs 48 will be apparent from the showing in Fig. 2. During operation of the oppositely rotating husking roll sections 16 and 17, as each husking point 64 approaches the region or line of contact of the surfaces of the husking roll sections, the leading side of the husking point engages the rubber-surfaced roll section 16, and as rotation of the roll sections continues, increased pressure is applied on the husking point by the surface portion of the oppositely rotating roll 16, the husking pin 64 is gradually forced inwardly onto the recess 52 in the outer face of the plug 41, as indicated with respect to the lower plug and spring assembly of Fig. 2, through flexure of the spring 48 along the rounded corner portion 62 thereof and at the bend between the portion 62 of the spring and the husking point 64, to a position wherein the husking point is retracted within the recess 52 as the portion of the surface of the roll 17 adjacent the husking point comes into contact with the roll section 16. As rotation of the rolls continues beyond this latter point, the husking point 64 gradually emerges from the recess 52 of the plug, due to the resilience of the spring 48, until the husking point reaches the normal extended position, indicated with respect to the upper plug and spring assembly of Fig. 2.

In the modified form of husking roll section shown in Fig. 8, the metal tube or roll section 32ª is not provided with an axially disposed shaft, corresponding to the shaft 31 of Figs. 1 and 2, and the apertures 40 in the roll sections are not diametrically alined. The supporting plug 41ª of resilient material is of a length to extend the full distance across the tube 32ª and to be held in position therein with the shoulder 42 of the plug bearing firmly against the inner surface of the tube well of the tube about the opening 40 therein; and the end face of the inner portion 67 of the plug is formed along a cylindrical surface concentric with, and is held in engagement with, the cylindrical inner surface of the tube. The outer portion 43 of the plug which projects through the opening in the tube is formed similarly to the corresponding portion of the plug 41 of Figs. 2, 3 and 4, and includes the recess 52, with its end abutment 53 and rounded bottom wall 56. The end face of the inner portion 67 of the plug is provided with a transverse recess 68 parallel to the recess 52 at the outer end of the plug. A spring 48ª has its outer end portion 62, 63 with the integrally formed husking extension 64 thereon, serving as a resilient husking peg, of the same design and cooperating with the plug in the same manner as the corresponding parts of the spring 48 of Figs. 2, 3, 5 and 6. And the inner end portion 69 of the spring is formed along an arc of such curvature as to lie closely against the inner wall of the tube 32 when the spring and plug assembly is in position in the tube. This end portion 69 fits closely in the recess 68 formed in the end of the plug, the depth of the recess being approximately the same as the thickness of the spring so as to permit the end portion of the spring to bear against both the inner surface of the tube 32 and the face of the recess 68. The end portion 69 of the spring is connected to the outer portion 62, 63 of the spring through a substantially straight section 70. The spring 48ª is assembled on the plug 41ª in the same general manner described in connection with the plug and spring assembly 41, 48 described hereinabove.

In the modified arrangement shown in Fig. 9, the plug and spring assembly 41ᵇ, 48ª is generally the same as that shown in Fig. 8, except that the inner end portion 67ª of the plug is formed with a shoulder portion 42 having a cylindrical face which engages the inner cylindrical surface or wall of the tube 32 about an opening 40 therein, and a reduced extension 43ª fitting in this opening. This latter end of the plug has its face provided with a transverse recess 71 through the extension 43ª and into the shoulder portion 42, and extending parallel to the recess 52 in the other end of the plug. The spring 48ª is similar in form to the corresponding spring of Fig. 8, and is correspondingly assembled on the plug. The recess 71 in the lower face of the plug is of such depth and width that the inner portion 69 of the spring fits closely and in guided relation in the recess, with the ends of the portion 69 in firm engagement with the face of the recess 71 and the inner surface of the tube 32 adjacent the aperture 40 therein. For facility in assembling, the inner end of the plug, with which the end portion 69 of the spring cooperates and the corresponding opening 40 may be of slightly reduced diameter to more easily permit insertion of this end of the spring and plug assembly through the opposite opening 40 which is normally occupied by the husking peg portion of the assembly. With the plug and spring assembly 41ᵇ, 48ª assembled as indicated, parts are effectively held in desired operative condition.

As indicated, the free end of the inner portion 69 of the spring 48ª of Figs. 8 and 9 extends considerably beyond the plug, and the extreme end of this portion of the spring may, if desired, be turned outwardly to project slightly and enter and fit closely within, but without passing through, a recess in the adjacent portion of the wall of the tube, to thus form additional positioning means, in the form of a detent, for the spring and plug assembly.

In the modified form of plug and spring assembly shown in Fig. 10, the plug 41ᶜ is of the same general form as the plug 41ᵇ of Fig. 9, except that a central transverse aperture 75 is formed through the central portion of the body of the plug, the plug being held in operative position in the roll through shouldered portions 42 at each end of the plug forcibly engaging the inner surface of the tube 32 about the diametrically opposite openings 40 therein, and with reduced end portions 43 at both ends of the plug fitting closely with the side edges of the corresponding openings 40 in the tube. Further, instead of being provided with the recess 71 and the reduced end portion 43ª, as in Fig. 9, both end portions of the plug are provided with similar recesses 52 like that of the plug 41 of Figs. 2 and 4. The spring 48ᵇ includes two similar end portions, like the end portions 62, 63, 64 of the spring 48 of Figs. 2, 5 and 6, joined by side portions 78 adapted to lie along opposite sides of the plug near the ends thereof, and an intermediate portion 79 connecting the two side portions 78 and disposed within the aperture 75 in the plug. This arrangement provides two resilient husking points 64 operatively mounted on a single supporting plug 41°. The spring 48ᵇ is assembled on the plug 41° by threading one end portion of the spring through the central aperture 75 and then rolling the end portions to the operative positions shown, the flexibility of the spring and the size of the aperture 75 permitting the necessary distortion of the spring in the general flexing plane and the manipulation of the spring to operative position on the plug.

With the spring element in position on the supporting plug of each of the assemblies of Figs. 8, 9 and 10, the method of insertion of the plug and spring assembly and mounting of the same in operative position in the husking roll section 17 will be apparent from the description hereinabove as to the plug and spring assembly of Figs. 2 and 3.

With the harvesting rolls in normal operation on a corn harvester working on standing corn in the field, ears of corn are removed from the stalks by the action of the picking or snapping rolls or roll sections 15, the picked ears moving rearwardly over the rolls, and along the trash-removing sections 18 which serve to remove and pass downwardly therethrough loose corn leaves or the like, the picked ears moving thence onto and along the husking roll sections 16, 17. As the picked ears move onto and along the husking sections 16, 17, the ear being disposed lengthwise in the recess between and at the upper side of these oppositely rotating roll sections, the husking points 64 scratch or bite into the husks on the ear and tear portions of the husks away from the ear, drawing these loosened portions of the husks farther into the space between the rolls, thus facilitating firm seizure of the husks by the rolls between their active roll surfaces. The husking point 64 is forced or retracted into the recess 52 at the outer face of its supporting plug during this latter action; and is resiliently withdrawn from such recess and into normal operative position as the adjacent surface portion of the roll moves past the line of contact between the two rolls. The rolls carry the husks therethrough and to the under side thereof, leaving the husked ear at the upper side of the rolls along which it travels rearwardly. Any loose portions of husks remaining at the upper side of the rolls and passing over the trash-removing roll sections 21 are seized and passed to the under side of the rolls, the husked ears passing rearwardly from the rolls to a point of collection.

It will be apparent that with the form of yielding husking peg and support therefor disclosed herein, a relatively simple husking point or peg arrangement is made available for attachment to one or both of the cooperative husking rolls, and it is one wherein the active husking element, made up of the yieldable support, held in position in and sealing the opening in the roll, and the yieldable husking pin or peg, can be readily assembled as a unit and mounted in self-retaining position on the roll. And it will be apparent that the interior of the husking roll section in which the husking points are mounted, are fully closed against the entrance of trash and dirt, and particularly against the entrance of mud and water which might freeze, and thus choke the openings in the roll and impede or prevent the satisfactory operation of yieldable husking points or pegs. And it will be apparent that any trash or mud entering the recess 52 in the outer face of the plug and beneath the outer portion 63 of the spring is immediately squeezed or rolled out by the flexing action of this portion of the spring during operation.

It will be apparent that the present invention is not limited to the particular features of design and construction described herein and shown in the drawing, and that the invention includes such other forms and modifications as are embraced within the scope of the annexed claims.

It is claimed and desired to secure by Letters Patent:

1. In a corn harvester, a husking roll having an aperture therein opening through the peripheral surface of the roll, a husking device mounted in said aperture and comprising a support insertible inwardly through said aperture to normal operative position therewithin and having a peripheral abutment portion adjacent its outer end, the outer end of said support being provided with a recess, said support being held in position within said aperture with the outer face of said abutment portion in forcible engagement with an inwardly facing abutment surface of said roll adjacent said aperture, and a husking element carried by said support and having a resiliently yieldable portion carrying a husking point normally projecting beyond the periphery of said roll, said resiliently yieldable portion of said husking element being deformable to retract said husking point to a position within said recess.

2. In a corn harvester, a husking roll comprising a relatively rigid tube provided with an aperture through the wall thereof, a husking device mounted in said aperture and comprising a yieldable support having a peripheral abutment portion of greater diameter than said aperture and insertible inwardly through said aperture to normal position within said aperture and engageable with the inner surface of said roll about said aperture, the outer end portion of said support beyond said abutment occupying said aperture and the outer end of said support being provided with a recess, and a husking element carried by said support and having a resiliently yieldable portion disposed within said recess and carrying a husking point normally projecting beyond the periphery of said roll, said husking element being resiliently deformable to retract said husking point to a position within the recess.

3. In a corn harvester, a husking roll comprising a relatively rigid tube having an aperture through the wall thereof, a husking device mounted in said aperture and comprising a yieldable support having a peripheral shoulder of greater diameter than said aperture and being insertible inwardly through said aperture to position therewithin, said shoulder being held in engagement with the inner surface of said tube about said aperture to prevent outward displacement of said support from said aperture, the outer end of said support beyond said shoulder fitting in and substantially closing said aperture and being provided with a recess, and a resiliently yieldable husking element carried by said support and having a terminal portion in the form of a husking point normally projecting beyond the periphery of said roll, said husking element being resiliently deformable to retract said husking point to a position within said recess through the forcing action of a second roll cooperative with said first roll during normal operation thereof.

4. In a corn harvester, a husking roll comprising a relatively rigid tube provided with a plurality of apertures through the wall thereof, husking devices mounted in said apertures and each comprising a support having a yieldable peripheral shoulder portion of greater diameter than said aperture and insertible to position within said aperture and engageable with the inner surface of said tube about said aperture to prevent outward displacement of said support from said aperture, the outer end of said support fitting in and substantially closing said aperture and being provided with a recess, the inner end of said support being formed with a curved surface of extended area in surface engagement with an interior portion of said roll of similar curvature, and a resiliently yieldable husking element carried by said support and having a terminal portion disposed at the outer side of said support and carrying a husking point normally projecting beyond the periphery of said roll, said husking element being deformable to retract said husking point within said recess on application of pressure thereto through the action of a second roll cooperative with said first roll during normal operation thereof.

5. In a corn harvester, a husking roll comprising a tube provided with a plurality of apertures through the wall thereof, husking devices mounted in said apertures and each comprising a resiliently yieldable support in the form of a plug-like element having a peripheral shoulder portion adjacent the outer end of the support, said support being insertible inwardly through and mounted in operative position within and substantially closing the aperture, and said support being yieldably held in position with the inner end thereof in forcible engagement with an interior surface portion of said roll and with said shoulder portion in forcible engagement with the inner surface of said tube about said aperture, the outer end of said support being provided with a recess, and a husking element mounted on said support and having a resiliently yieldable portion disposed in said recess and carrying an active husking point normally projecting from said recess and beyond the periphery of said roll, and said yieldable portion being deformable to yieldably retract said husking point to a position within said recess on application of externally applied force to said husking point during normal operation of said roll.

6. In a corn harvester, a husking roll comprising a tube provided with a plurality of apertures through the wall thereof, husking devices mounted in said apertures and each comprising a support of resiliently yieldable material in the form of a plug-like element insertible to operative position within an aperture and having a peripheral shoulder portion adjacent the outer end of the support and of greater cross-sectional area than said aperture, said support substantially closing said aperture and the outer end of said support being provided with a recess, the inner end face of said support being provided with a curved surface of extended area in engagement with a correspondingly curved inner surface portion of said roll, said inner end surface of said support having a recess extending thereacross, a husking element mounted on said support and having a resiliently yieldable portion carrying an active husking point normally projecting beyond the periphery of said roll and being yieldably retractible to a position within said recess on application of externally applied force to said husking point during normal operation of said roll, said husking element being provided at its inner end with a resiliently yieldable portion disposed in guided relation in said recess at the inner end face of said support, and said support being held in operative position with said peripheral shoulder portion thereof in engagement with the inner surface of said tube about said aperture, and the inner face of said support and said resiliently yieldable portion at the inner end of said husking element in extended surface engagement with said inner curved surface portion of said roll.

7. In a corn harvester, a husking roll comprising a tube having an aperture through the wall thereof, a husking device mounted in said tube and comprising a plug-like support having a laterally yieldable portion of greater normal cross-sectional area than said aperture and insertible inwardly through said aperture to operative position in said tube, said support substantially closing said aperture with said laterally yieldable portion in engagement with the inner face of said tube about said aperture and preventing withdrawal of said support from operative position, the outer end of said support being provided with a recess, and a husking element carried by said support and including a resiliently yieldable portion carried at the outer face of said support and being provided with a husking point normally projecting beyond the periphery of said roll and retractible under externally applied pressure during normal operation of said roll to force said husking point into said recess in said support to a position within the periphery of said roll.

8. In a corn harvester, a husking roll comprising a tube having an aperture through the wall thereof, a husking device mounted in said aperture and comprising a laterally yieldable plug-like support having a shoulder portion of greater normal cross-sectional area than said aperture and insertible through said aperture to operative position in said tube, said support substantially closing said aperture and having its inner end in engagement along an extended curved surface area with an interior surface portion of corresponding curvature on said roll and said shoulder portion being in engagement with the inner face of the tube about said aperture, said support being provided at its outer face with a recess, and a husking element carried by said support and having a resiliently yieldable portion disposed in said recess and having a husking point normally projecting beyond the periphery of said roll, said resiliently yieldable portion being deformable under externally applied pressure during normal operation of said roll to force said husking point to a position within said recess.

9. In a corn harvester, a husking roll comprising a tube having an aperture through the wall thereof, said tube being mounted on a shaft disposed axially within and spaced from the wall of said tube, a husking device mounted in said aperture and comprising a plug-like support having a shoulder portion of greater normal cross-sectional area than said aperture and insertible to the space within said tube, said shoulder portion being in engagement with the inner face of the tube about said aperture to prevent withdrawal of said support from operative position, said support substantially closing said aperture and being provided at its outer end with a recess, and the inner end face of said support being provided with a concave surface of extended area and of the same curvature as the surface of said shaft and being in engagement with said shaft along said surface, and a husking element carried by said support and having a resiliently yieldable portion provided with a husking point normally projecting beyond the periphery of said roll, said resiliently yieldable portion being deformable under externally applied pressure during normal operation of said roll to force said husking point into a position within said recess.

10. In a corn harvester, a husking roll comprising a relatively rigid tube having an aperture through the wall thereof, said tube being mounted on a shaft disposed axially within and spaced from said tube, a husking device mounted in said aperture and comprising a plug-like support having a shoulder portion of greater normal cross-sectional area than said aperture and being laterally yieldable to permit insertion thereof through said aperture to the space within said tube, said support substantially closing said aperture and being provided at its outer end with a recess, and a husking element carried by said support and having a resiliently yieldable outer portion disposed in said recess and provided with a husking point normally projecting beyond the periphery of said roll, an extended area of the inner end face of said support being concentric with said shaft and in substantial engagement therewith and being provided with a shallow recess, said husking element having a resiliently yieldable inner portion occupying said shallow recess and being in engagement with the surface of said shaft over an extended area, said laterally yieldable portion of said support being in engagement with the inner face of the tube to prevent withdrawal of said support from operative position, and said outer resiliently yieldable portion of said husking element being deformable under externally applied pressure to force said husking point into a position within said outer recess.

11. In a corn harvester, a husking roll comprising a relatively rigid tube mounted on a shaft disposed axially of said tube, said tube being provided with a plurality of apertures, husking devices mounted in said apertures and each comprising a support insertible to position within one of said apertures and having a resiliently yieldable external shoulder near the outer end of the support and engageable with the inner surface of said tube about said aperture and an end portion of reduced cross-sectional area with respect to said shoulder portion fitting in and substantially closing said aperture, the outer face of said support being provided with an open recess, the inner end of said support being provided with a curved surface of substantially the same curvature as the surface of said shaft, said support being held in operative position with the inner face of said support in substantial surface engagement with said shaft and said shoulder portion in engagement with the inner surface of said tube about said aperture therein, and a resiliently yieldable husking element formed of relatively flat spring material carried by said support and having a portion occupying said recess in the outer face of said support and having a terminal portion provided with a husking point normally projecting beyond the periphery of said roll, said husking element being deformable to retract said husking point within said recess through the action of pressure applied to said husking point by a second roll cooperative with said husking roll during normal operation thereof.

12. In a corn harvester, a husking roll comprising a relatively rigid tube mounted on a shaft disposed axially thereof, said tube being provided with a plurality of apertures, husking devices mounted in said apertures and each comprising a resiliently yieldable support insertible to position within one of said apertures and having an external shoulder near the outer end of the support and engageable with the inner surface of said tube about said aperture, and an end portion of reduced cross-sectional area with respect to said shoulder portion fitting in and substantially closing said aperture, the outer end of said support being provided with a recess, and the inner face of said support being provided with an open recess extending in a direction transverse to the axis of said shaft, and a resiliently yieldable husking element formed of relatively flat spring material carried by said support and having a portion occupying said recess in the outer face of said support and provided with a terminal portion in the form of a husking point normally projecting beyond the periphery of said roll, said husking element including a portion of approximately the same curvature as the surface of said shaft and extending across the inner face of said support and fitting in guided relation within said recess in said face of said support, and said support being held in operative position in said roll with said latter portion of said husking element bearing against said shaft and against the face of said recess at the inner end of said support, and said shoulder portion of said support bearing firmly against the inner surface of said roll about said aperture therein, the outer portion of said husking element being deformable to retract said husking point within the recess at the outer end of said support through the effect of pressure applied to said husking point during normal operation of the harvester.

13. In a corn harvester, a pair of rotatably mounted harvester rolls each comprising cooperative husking roll portions, one of said husking rolls including a tube provided with a plurality of apertures opening to the interior thereof, a husking device mounted in each of said apertures and comprising a support inserted in the aperture and substantially closing the same and having a circumferential shoulder near its outer end in engagement with the inner surface of said tube about said aperture and retaining said support against withdrawal from said aperture, the outer face of said support being provided with a recess elongated in a direction transversely of the axis of said tube, and a resiliently yieldable husking element carried by said support and having a portion occupying said recess and a portion serving as a husking point normally projecting beyond the periphery of said tube, said husking element being operative to retract said husking point to a position within said recess in response to pressure exerted on said husking point by the other of said cooperative rolls during normal operation thereof.

14. In a corn harvester, a pair of rotatably mounted harvester rolls each comprising cooperative husking roll portions, one of said husking rolls including a tube provided with a plurality of apertures opening to the interior of the tube, a husking device mounted in each of said apertures and comprising a support inserted to position within said aperture and substantially closing the same and having near its outer end a resiliently laterally yieldable circumferential shoulder insertible through said aperture, the outer face of said support being substantially coextensive with the surface of said roll and being provided with a recess elongated in a direction transversely of the axis of said tube, said support having its inner end face provided with a surface portion of extended area of cylindrical shape, and said support being held in operative position with the cylindrically shaped surface at its inner face in substantial engagement with a correspondingly shaped interior surface portion of said roll and said shoulder portion adjacent the outer end of the support in engagement with the inner surface of said tube about said aperture therein, and a husking element carried by said support and having a resiliently yieldable portion occupying said recess and having an end extension serving as a husking point and normally projecting beyond the periphery of said tube, said husking point being retractible to a position within said recess in response to pressure exerted on said husking point by the other of said cooperative rolls during normal operation thereof.

15. In a corn harvester, a husking roll comprising a hollow relatively rigid tube provided with a plurality of diametrically opposite apertures, a husking device mounted in said apertures of the roll and comprising a yieldable support having an external shoulder portion adjacent each end thereof in yielding forcible engagement with the inner surface of said tube about said apertures to prevent outward displacement of said support from said apertures, and providing reduced end portions disposed within and substantially closing said apertures, the end faces of said support being each provided with a recess, and a husking element carried by said support and comprising resiliently yieldable portions disposed in each of said recesses in the end faces of said support and each carrying a husking point normally projecting beyond the periphery of said roll, said support being insertible to operative position through one of said apertures and being held in position with said shoulder portions in engagement with the inner surface of said tube about said apertures, said portions of said husking element being deformable to retract said husking points within said recesses through the action of a second roll cooperative with said first roll during normal operation thereof.

16. A husking device for attachment in an aperture in a tubular husking roll, comprising a body of plug-like form having a recess at one end face thereof and a resiliently yieldable peripheral shoulder portion adjacent said end face and of greater diameter than said aperture and insertible inwardly therethrough to operative position within said roll, and a husking element mounted on said support and having a resiliently yieldable portion provided with an active husking point over said recess and normally projecting beyond said end face of said support, said resiliently yieldable portion of said husking element being resiliently deformable to retract said husking point to a position within said recess.

17. A husking device for attachment in an aperture in a tubular husking roll, comprising a yielding supporting element of plug-like form having a recess at one end face thereof and a peripheral shoulder portion adjacent but removed from said end face, the opposite end face of said supporting element being provided with an open recess, a husking element comprising a body portion disposed at the side of said supporting element and extensions of resiliently yieldable material at opposite ends of said body portion and disposed in said recesses at the end faces of said support, said extension associated with said first recess carrying an outwardly extending husking point normally projecting beyond the adjacent face of said supporting element, said latter extension being resiliently deformable to force said husking point into said recess, the normal distance between said end extensions of said husking element being less than the distance between the inner sides of said recesses in the end faces of said supporting element, and said husking element being held in position on said supporting element by pressure exerted by said resilient extensions of said husking element on the adjacent inner faces of said recesses.

18. In a cron harvester, a husking roll having an aperture therein opening through the peripheral face of the roll, a husking device mounted in said aperture and comprising a support insertible inwardly through said aperture to normal operative position therewithin and having a peripheral abutment portion adjacent its outer end, the outer end of said support being provided with a recess, and said support being held in position within said aperture with the outer face of said abutment portion in forcible engagement with an inwardly facing abutment surface of said roll adjacent said aperture, and a husking element carried by said support and having a resiliently yieldable portion carrying a husking point normally projecting beyond the periphery of said roll and being yieldably retractible to a position within said recess through the forcing action of a second roll cooperative with said first roll during normal operation thereof.

19. A husking device for attachment in an aperture in a tubular husking roll comprising a body of plug-like form having a recess at one end face thereof and a resiliently yieldable peripheral shoulder portion adjacent said end face and of greater diameter than said aperture and insertible inwardly through said aperture to operative position therewithin, and a husking element mounted on said support and having a resiliently yieldable portion provided with an active husking point over said recess and normally projecting beyond said end face of said support, said husking point being yieldingly retractible to a position within said recess.

CHARLES J. SCRANTON.